Patented Jan. 3, 1933

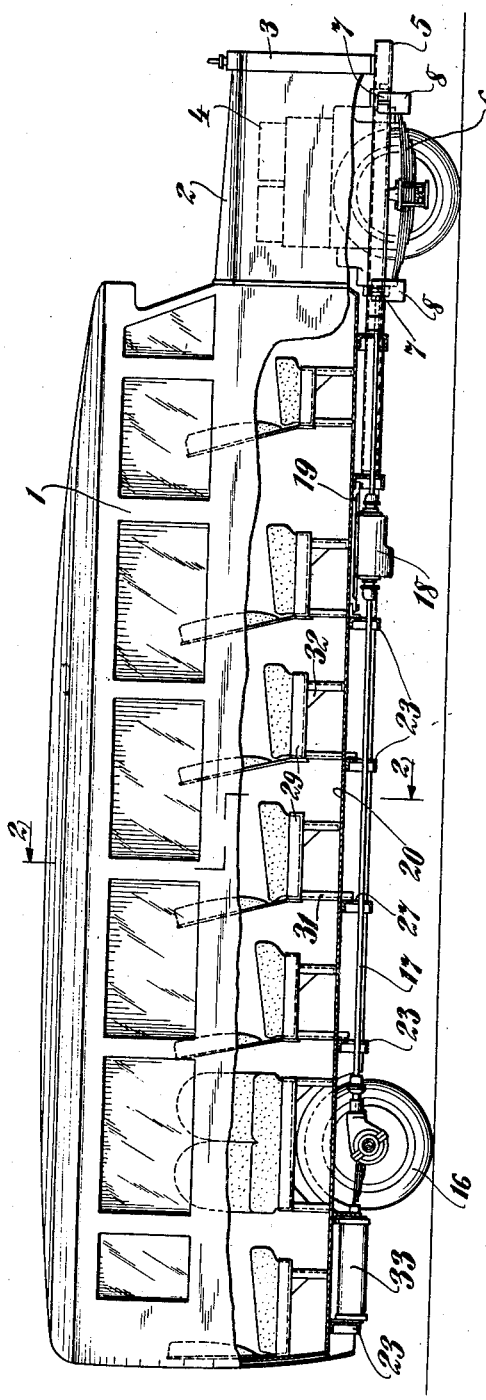

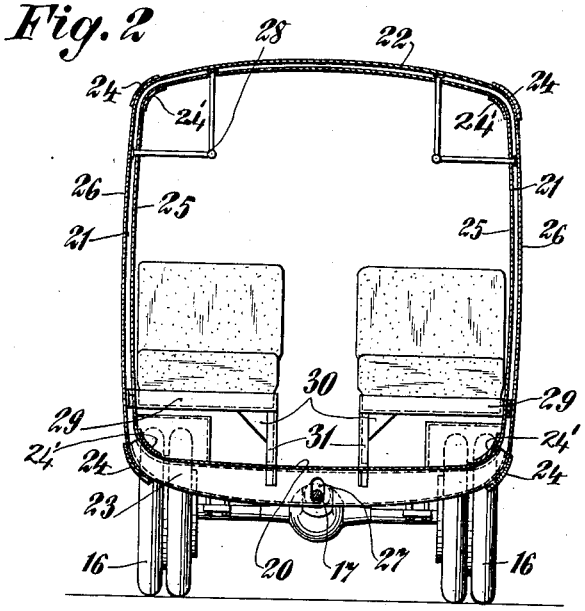
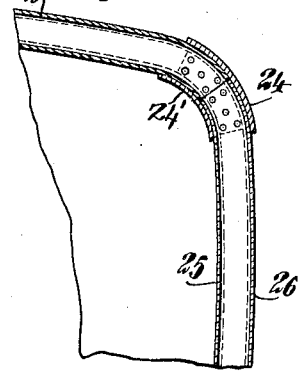
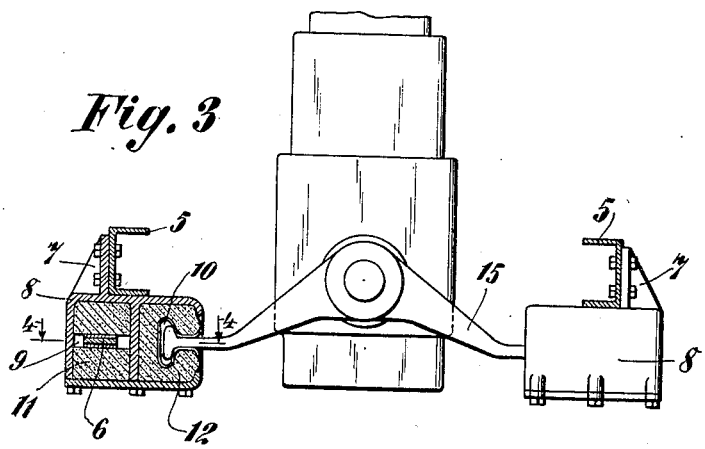
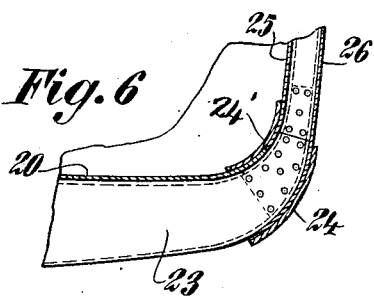
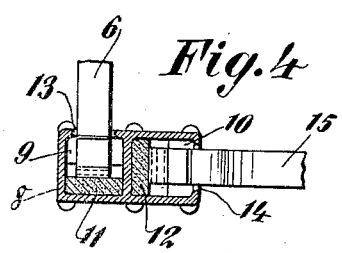

1,892,666

UNITED STATES PATENT OFFICE

ERVING R. GURNEY, OF ALLENTOWN, PENNSYLVANIA, ASSIGNOR TO INTERNATIONAL MOTOR COMPANY, OF NEW YORK, N. Y., A CORPORATION OF DELAWARE

BUS BODY WITHOUT CHASSIS

Application filed May 3, 1930. Serial No. 449,396.

The present invention relates to motor vehicles and embodies, more specifically, an improved vehicle construction, wherein the body is formed as a unit in such manner that considerable strength is imparted thereto while preserving the weight below a predetermined desired maximum. Previous attempts to construct vehicle bodies of the so-called frameless type have employed cast sections or pressed steel sections in order to afford the desired strength. The objectionable feature of cast sections is that the cost of machining and fitting is prohibitive and furthermore, all strains must be taken by castings which, although of aluminium alloys, have to be heavy and bulky to withstand the stresses impressed upon them. The pressed steel sections are impractical because of the prohibitive cost of dies for the great number and variety of pressing operations involved. These pressed steel sections furthermore have to be thick enough to prevent the so-called papering thereof and thus render the sections unduly heavy.

With a view to providing an improved frameless vehicle body having sufficient lightness, a construction has been designed by means of which a considerable number of the parasitic elements have been employed to serve as bracing and load supporting members. Under various conditions of operation, certain of the frame elements are under tension a portion of the time and at other times are under compression. This particularly is true of the lower stringers or tension members of the vehicle body when the vehicle is at rest. When the vehicle gets into motion these members are under compression during acceleration, as well as during application of the front brakes, while in the event of rear braking, they again function under tension. When opposite corner wheels of the vehicle rest upon irregularities in the road surface, a violent twist is set up in the frame, causing distortion thereof. These stresses are to be taken by certain bracing elements, in particular, the baggage rack, etc., which heretofore constituted a parasitic static load upon the vehicle.

More particularly, the present invention embodies the construction of a motor vehicle body in such manner that relatively light and thin body and bracing members may be utilized, the configuration of substantially all of the body members being curved to resist, more effectively, compression stresses.

An object of the invention, accordingly, is to provide a vehicle body of the so-called frameless type, wherein comparatively great strength is provided, the lightness of the body being preserved.

A further object of the invention is to provide a body of the above character, wherein certain of the elements heretofore constituting parasitic loads upon the vehicle are utilized as an integral part thereof to brace portions of the body.

A further object of the invention is to provide an improved vehicle body upon which the engine, transmission, fuel tank, seats, baggage rack, and other elements are effectively mounted in such manner that they contribute materially to the strength of the body.

Further objects, not specifically enumerated above, will be apparent as the invention is described in greater detail in connection with the accompanying drawings, wherein:

Figure 1 is a view in side elevation, partly broken away and in section, showing a vehicle constructed in accordance with the present invention.

Figure 2 is a view in section, taken on line 2—2 of Figure 1, and looking in the direction of the arrows.

Figure 3 is a view in front elevation, partly broken away, and in section, showing the manner in which the engine is mounted upon the vehicle frame.

Figure 4 is a view in section, taken on line 4—4 of Figure 3, and looking in the direction of the arrows.

Figure 5 is an enlarged segmental view, similar to a portion of Figure 2, showing the manner in which the upper corners of the body are braced.

Figure 6 is an enlarged view in section, showing the manner in which the lower corners of the frame are braced. Referring to the above drawings, a vehicle body is shown at 1 having a hood 2 and radiator 3 as in the conventional form. An engine 4 is mounted within the hood and is carried by forward frame members 5 which extend rearwardly and are secured to a plurality of transverse sections to be described hereinafter. In order that the engine may be isolated as far as possible from the vehicle body, it is mounted substantially directly upon the springs. In this manner, the engine is relieved of the weaving stresses which are usually transmitted thereto from the body and the body likewise is relieved from the stresses set up by the engine under various conditions. To effect the mounting in the above manner, the forward springs 6 are mounted at their ends in brackets 7 which are secured to the frame members 5. Housings 8 are formed upon the brackets and provided with two compartments 9 and 10. In these compartments, blocks of yielding nonmetallic material 11 and 12 are provided, respectively, suitable openings 13 and 14 being provided in the housings to receive the ends of the springs 6 and the ends of an engine mounting bracket 15, respectively. In this manner, the engine is mounted substantially directly upon the springs and the frame is thus relieved of the static as well as torsional stresses so frequently set up thereby.

The rear driving wheels 16 receive power through a propeller shaft 17 and transmission 18, in the usual fashion. The transmission cover 19 preferably constitutes a portion of the floor 20 of the body of the vehicle, the cover being a substantial continuation thereof in configuration. In this manner, not only is considerable space saved but the transmission cover, which has heretofore constituted a parasitic portion of the vehicle, is used as a portion of the floor, as well as a bracing member to contribute strength to the vehicle body.

In order that the body may be made as light as possible, all of the sides thereof are formed with a slight curvature. The posts 21 have a slight outward bow and abut against the roof trusses 22 and floor beams 23. At the joints between these members transversely curved longitudinally extending frame members 24 and 24' are provided, the body thus being formed of a series of transverse channel members of suitable formation forming complete sections over which the inner and outer side walls 25 and 26, respectively, are mounted. The curved frame members 24 and 24' are suitably secured to the transverse body sections for substantially their area of contact therewith, and provide stiffening webs arranged in substantial longitudinal parallelism, which webs resist bending and loading stresses from a plurality of directions and take a major portion of the load. The side walls likewise have a curved configuration to conform with the transverse sections and this curved formation enables them to be made quite thin and light without showing waves in the body after it has been painted.

It will thus be seen that the floor 20 curves slightly inwardly toward its median section, thus greatly facilitating the cleaning thereof since it can be flushed and the water and dirt will float to the center of the aisle and thus readily be removed.

The propeller shaft 17 may pass through suitable slots 27 in the floor beams 23 which may be formed to provide the required clearance. By providing the floor with a slight curvature, drumming is eliminated and the entire structure is braced cornerwise.

The baggage rack 28 is secured along the top corners of the body and runs longitudinally therethrough to brace, effectively, these points. The longitudinal members 29 of the seat frames are secured to the side posts 21 and braced at 30 with the vertical members 31 to strengthen materially the lower corners of the frame, the vertical members 31 being secured directly to the floor beams 23. Additional braces 32 are provided on the seat frames to afford the desired bracing against stresses set up in a longitudinal direction in the frame. The baggage rack 28 being secured directly to the roof trusses 22 and posts 21, contribute materially to the strength of the body. Rearwardly of the body and between two adjacent floor beams 23, the gasoline tank 33 is mounted, the tank thus constituting an effective bracing member between these beams.

It will be seen that the assembling of the elements described above may be done by riveting, welding, or any other suitable method, the resulting structure being of great strength, minimum weight, and comparatively inexpensive to manufacture. A great number of the elements can be rolled from rolls of thin sheet metal and bent to the form of curve desired. The use of the transmission, seat frames, baggage racks, tanks, etc., as bracing members increases the strength of the body materially, at the same time permitting the weight thereof to be decreased.

While the invention has been described with specific reference to the accompanying drawings, it is not to be limited, save as defined in the appended claims.

I claim as my invention:

1. A vehicle body comprising a plurality of transverse body sections comprising floor beams, posts, and roof trusses, said sections being formed with an outward curvature upon each of the four sides thereof, the curvature of any side being symmetrical about the median plane of that side, a plurality of curved, longitudinally extending frame members at each of the four corners of the transverse body sections for connecting said sections, each frame member being a transversely curved plate for providing a stiffening web which is secured to the transverse body sections for substantially its area of contact with said body section, said stiffening web, by reason of its curvature, and its engagement with the body sections serving to resist bending stresses from a plurality of directions, said curved longitudinally extending frame members carrying the major portion of the bending and loading stresses, the assembly providing a rigid body without the use of longitudinally extending beams placed below the floor as in the usual vehicle body.

2. A vehicle body comprising a plurality of transverse body sections comprising floor beams, posts, and roof trusses, said sections being formed with an outward curvature upon each of the four sides thereof, the curvature of any side being symmetrical about the median plane of that side, a plurality of curved, longitudinally extending frame members at each of the four corners of the transverse body sections for connecting said sections, arranged in cooperating pairs, one member of each pair extending along the outside of the transverse body sections, the other member of the pair extending along the inside of the body sections, in substantial longitudinal parallelism with each other, each frame member being a transversely curved plate for providing a stiffening web which is secured to the transverse body sections for substantially its area of contact with said body section, said stiffening web, by reason of its curvature, and its engagement with the body sections serving to resist bending stresses from a plurality of directions, said curved longitudinally extending frame members carrying the major portion of the bending and loading stresses, the assembly providing a rigid body without the use of longitudinally extending beams placed below the floor as in the usual vehicle body.

This specification signed this 28th day of April, A. D. 1930.

ERVING R. GURNEY.